United States Patent Office 2,870,041
Patented Jan. 20, 1959

2,870,041

PROCESS FOR PREVENTING ALDEHYDE ODORS

Howard M. Waddle, James F. Cotton, and Richard E. Hudson, Jr., West Point, Ga., assignors to West Point Manufacturing Company, West Point, Ga., a corporation of Georgia No Drawing. Application June 2, 1958
Serial No. 738,919

10 Claims. (Cl. 117—62)

The present invention relates to certain novel improvements for avoiding or controlling the formation of undesirable odors, such as aldehyde and amine odors, normally encountered in fabrics or similar materials which have been treated with thermosetting aldehyde resins or the like.

Textile fabrics, woven or non-woven, paper and the like are frequently treated with thermosetting resins containing formaldehyde or other higher aldehydes for a variety of purposes. Thus, for example, these resins are used to improve the wet strength of paper, or the dimensional stability, crush and wear resistance, durability, and appearance of textiles such as cotton, rayon, nylon and the like. The more recently developed wash-and-wear textiles are also treated with thermosetting resins frequently in combination with synthetic rubbers or other thermoplastic polymers. The bonding of non-woven fabrics likewise is frequently accomplished by means of thermosetting resins with or without an acrylic or other thermoplastic polymer or synthetic rubber dispersion generally similar to those recommended for use in wash-and-wear applications.

Materials treated with thermosetting aldehyde resins have the disadvantage of developing fishy, formaldehyde, rancid or otherwise unpleasant odors under certain conditions. These odors are apparently caused by traces of free aldehyde and/or amines formed by reaction between free aldehydes and ammonia or any ammonium compound present as the curing catalyst or formed in the curing process (see Textile Finishing Bulletin 129 "Odor Prevention in Resin Treated Fabrics," American Cyanamid Company). In any event, these odors prove offensive or objectionable to the consumer and detract from the sales appeal of the resin-treated material. The odor problem may be particularly serious in air-conditioned stores where resin-finished garments on display in some instances liberate so much formaldehyde that the atmosphere in the entire store becomes offensive.

Various techniques and methods have been suggested for controlling the above mentioned odors. Typical of these prior attempts to produce materials of low odor level are those involving incorporation of urea and dicyandiamide in the resin bath to act as acceptors for free formaldehyde; use of amine-free or blocked-amine type catalysts; elimination of ammonia as a pH control agent by using, for example, triethanolamine; washing of the fabric after resin treatment and cure to remove either free acidity from the resin catalyst, the catalyst itself, unreacted formaldehyde, and/or low polymer, so as to leave the fabric in a neutral to slightly alkaline condition. Wash bath recommendations range from neutral process water with surfactant to mild alkali bath, using soda ash, tetrasodium pyrophosphate, or the like, followed by rinsing.

All of the above mentioned prior efforts leave much to be desired in the way of effective odor control and simplicity of operation, etc. There is, therefore, still a real need in the art for a straightforward, inexpensive method for controlling or eliminating odors, in materials treated with thermosetting aldehyde resins and it is the principal object of the present invention to provide such a method. Other objects will also be hereinafter apparent.

Broadly stated, the method of the present invention involves impregnating resin-treated material subject to aldehyde and/or amine odors with an aqueous solution containing the ion $HSO_3^-$ followed by drying and, if desired, curing the thus treated material. The impregnating step of the invention may be carried out in combination with the resin treatment or, if desired, after resin application and full or partial curing.

The success of the invention is due, to a significant extent, in the discovery that free or potentially free formaldehyde or other aldehyde which would normally result in the formation of the above discussed odors, can be effectively converted into a stable odorless product by means of the $HSO_3^-$ ion under the conditions prescribed herein. By way of explanation only and without intent to limit the invention thereto, it appears that the free or potentially free formaldehyde reacts according to the following equation, using sodium bisulfite as the source of $HSO_3^-$ ion, to form an odorless formaldehyde addition product:

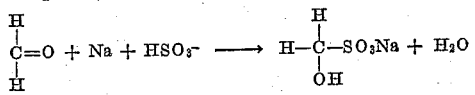

While the above mentioned addition product may be broken down by strong acids or bases, it does not appear to be effected by the mildly acidic or alkaline reagents normally encountered in laundering or other conventional operations to which resin-treated fabrics or like materials are subjected. In fact, it appears that the addition product may react with the resin itself to give a highly stable complex. Possibly, stable salt-forming sulfonate groups are developed on the terminal methylol groups. Whatever the ultimate reaction may be, it is significant only in that the desired result, i. e., complete odor control, is obtained.

Another surprising result of the invention is that the odor control agent which supplies the $HSO_3^-$ ions apparently may also function as a catalyst to cure the resin. Thus, when the odor control agent is incorporated in the material simultaneously with the resin treatment, conventional resin curing catalysts may be omitted or added as desired. Any catalyst normally used to cure thermosetting resins may be used in combination with the odor control agent for this aspect of the invention. As typical, there may be mentioned ammonium salts such as ammonium sulfate, chloride, phosphate and the like; amine hydrochlorides exemplified by 2-methyl-, 2-amino-, 1-propanol hydrochlorides; zinc salts including the chloride, sulfate, nitrate and fluoborate; and magnesium chloride.

Water-soluble organic and inorganic compounds capable of forming $HSO_3^-$ ions in aqueous solution may be used as the odor controlling agent of the invention. Particularly desirable is sodium meta bisulfite ($Na_2S_2O_5$) because of its availability and low cost. However, there may also be used other water soluble salts of sulfurous acid, for example, the sulfites and bisulfites of the alkali metals of group IA of the periodic table, i. e., lithium, sodium, potassium, rubidium and cesium and of the alkaline earth metals of groups IIA, such as beryllium, magnesium, and calcium, as well as those of zinc and aluminum. Ammonium bisulfite, sulfurous acid per se or sulfur dioxide in solution ($SO_2+H_2O \rightarrow H_2SO_3$) may also be used.

It is an important feature of the invention that the $HSO_3^-$ ion be applied to the material under controlled pH conditions, namely, in a pH range between 4 and 8, and preferably between 5 and 6. Use of pH conditions substantially in excess of 8 do not give the outstanding odor control which is otherwise achieved by the present invention.

The amount of odor control agent to be used according to the invention can be widely varied, the optimum in any particular case depending upon other operating factors, such as the nature and amount of resin applied to the material, the degree of cure, whether the agent is added simultaneously with or after the resin treatment, etc.

Generally speaking, sufficient odor control agent should be used to react with all free and potentially free formaldehyde. In the case where the agent is added to the material in combination with the resin, from 1 to 3 mols of the agent per theoretical mol of methylol groups in the resin may be utilized with 1.6 mols of agent preferred. More than the indicated amount of agent may be used but if there is too great an excess the odor of sulfur dioxide may be detectable. When the agent is applied as an after pad to the cured, resin-treated fabric or other fibrous material, a substantially smaller amount thereof may be used down to about 0.01 mol, and preferably not in excess of 1.0 mol, per theoretical mol of methylol groups in the resin.

Any resin-treated fibrous material normally subject to the formation of undesirable odors from aldehydes may be processed according to the invention described herein. This includes paper and textile materials such as fibers, yarns and fabric, whether woven or non-woven, comprising natural or synthetic fibers, particularly cotton, wool, rayon, nylon, linen, etc. These fibrous materials may be treated with any of the usual theormosetting and cross-linking resins containing formaldehyde or higher aldehydes in various molar ratios either in precondensate or condensed form. As specific examples, there may be mentioned, urea-formaldehyde, methylated urea formaldehyde, ethylene urea formaldehyde, and alkyl-substituted ethylene urea formaldehyde resin, 1,3-di-methylol 5-methyl perhydrotriazone, melamine formaldehyde, methylated melamine formaldehyde, dicyandiamide formaldehyde, phenol formaldehyde, ketone formaldehyde, thio-ureas and similar modifications with formaldehyde, guanidine formaldehyde, resins based on acetaldehyde, benzaldehyde, butyraldehyde, resins using higher aliphatic blocking groups to replace methyl such as ethyl, propyl, butyl, etc., modified glycol acetal-formaldehyde, pentaerythritol acetalformaldehyde, and mixtures of one or more of the above resins with or without the addition of other resins, such as epoxy resins, natural and synthetic rubbers based on butadiene, or the like, acrylate homopolymers, copolymers, terpolymers, particularly those containing reactive groups such as acrylic and methacrylic acid.

As indicated heretofore, the odor control treatment may take place simultaneously with the resin treatment or subsequent thereto after curing of the resin. When the odor control represents an after treatment, the fully or partially cured resin-treated material may be padded in one or more ways with an aqueous solution containing the desired agent within the concentrations indicated heretofore. One suitable way is a single pad conducted at elevated temperatures, e. g., 160-190° F., followed by drying and curing. Preferably, however, a multiple padding operation is carried out, desirably two consecutive paddings with the agent or a conventional washing agent commonly used in resin after finishing at elevated temperature followed by one or more paddings with wash water to remove formaldehyde, and then further padding with the odor control agent at room temperature or some other convenient temperature. At this point, other finishing agents may also be incorporated with the agent followed by drying and curing. Whether a single or multiple pad is used, the fabric or other material impregnated with agent is dried, and preferably cured, by heating at 250 to 325° F., for from 3 to ½ minute.

In the case where the odor control agent is applied to the material simultaneously with the resin treatment, conventional resin baths may be modified to include a bisulfite or other agent. As an example, non-woven fabrics are frequently prepared by impregnating a fibrous web with a binder emulsion comprising an acrylic polymer, a melamine-formaldehyde precondensate and a curing catalyst of the type indicated heretofore such as zinc nitrate. The thus treated web is then usually dried and cured by heating at 300° to 325° F., for 2 to 1 minute. For present purposes, the desired amount of odor control agent may be incorporated into the binder emulsion. If desired, the curing catalyst may be eliminated or the amount thereof reduced. The fabric may then be impregnated, dried and cured in conventional manner.

The invention is further illustrated by the following examples:

Example I

Apparel type non-woven fabric was produced by impregnating fibrous webs (cotton fiber) with the following binder formulations wherein parts are by weight:

| | |
|---|---|
| Acrylic emulsion | 93 |
| Methylated methylol melamine | 7 |
| Di ammonium phosphate catalyst | 1.5 |
| Water sufficient to give 10-40% total solids. | |

The thus treated web was dried and cured for two minutes at 300° F. The resulting non-woven fabric was then subjected to an after pad treatment involving two nips in pad boxes with squeeze using 0.5% sodium bisulfite at 180° F. The wet pickup amounted to about 100% representing approximately 0.185 part bisulfite per part formaldehyde resin. The fabric was dried and cured by heating at 275° F., for two minutes to give a product which was essentially odor free even upon long standing in a closed area.

Alternatively, the fabric treated with bisulfite in the manner described above may be washed with water, e. g., two nips in pad boxes with squeeze using water at 125° F., followed by one nip with differential squeeze in and out, cold, to pick up 0.5% sodium bi-sulfite for added odor control and 0.5% textile softener (e. g., polyethylene emulsion) to improve hand and sewability. This is followed by drying and curing at 275° F. for two minutes to give a product effectively free of odor.

Example II

The procedure of Example I was modified by including the bisulfite in the binder formulation:

| | |
|---|---|
| Acrylic emulsion | 90 |
| Methylated methylol melamine | 10 |
| Sodium bisulfite | 23 |

The non-woven fibrous web was saturated with the above formulation in the usual manner, excess binder being removed so as to leave 10-100 parts by weight of total binder solids on the weight of fibrous web. The web was then dried and cured at 300° F. for two minutes.

In this particular example, it will be noted that no conventional resin catalyst was necessary for the resin since the bisulfite effectively served as both the catalyst and odor control agent. The acrylic emulsion used in this example and Example 1 was Rhoplex B-15, same being a soft lower alkyl acrylate polymer including acrylic acid.

Example III

A 0.5% by weight solution of sodium meta bisulfite was maintained at room temperature (20-25° C.) in pad box. A woven cotton fabric which had previously been treated with thermosetting resin (methylated methylol melamine), dried and cured was padded through the pad box and squeezed to leave about 100% wet pickup of the solution. The fabric was then dried to leave the odor control agent in place on the fabric and cured at 275° F., for two minutes. No odor was apparent, even upon long standing.

A small amount (0.1% by weight) of surface active agent may also be included in the bisulfite solution to improve the speed and efficiency of wetting of the fabric. Typically suitable surface active agents are: alkyl phenoxy polyethoxyethanol (Triton X–100); sodium alkyl aryl sulphonates (Santomerse S).

*Example IV*

A 0.5% by weight solution of sodium meta bisulfite was maintained at 180° F., in a pad box. A woven cotton fabric which had previously been treated with thermosetting resin (namely, dimethylol ethylene urea), dried and cured, was padded through the pad box and squeezed to leave about 100% wet pickup of the solution. The fabric was then rinsed thoroughly in a conventional textile washing train to remove part of the agent and soluble resin ingredients. The fabric was then dried and cured at 275° F., for two minutes to give a highly desirable, odor-free product.

*Example V*

The fabric of Example IV was further processed, either wet or dry, by passing through a similar bath of sodium meta bisulfite to leave 0.5% sodium meta bisulfite on the fabric which was then dried and cured at 275° F., for two minutes. The product was effectively free of odor.

If desired, other finishing agents such as polyethylene emulsion may be included in the bath of this example.

*Example VI*

A ratio of 16:7 parts of sodium meta bisulfite with thermosetting resin (commercially available methylated methylol melamine) with an auxiliary resin catalyst (namely, 0.25% on bath weight of zinc nitrate) at a 15% total solids concentration was padded on woven rayon fabric and squeezed to give 100% wet pickup. The fabric was then dried and cured at 325° F., for 1½ minutes to give an odor-free product. Substantially similar results may be obtained by omitting the zinc nitrate catalyst or replacing same with another catalyst such as diammonium phosphate.

*Example VII*

A ratio of 16:7 parts of sodium meta bisulfite with thermosetting resin (di methylol ethylene urea) with or without auxiliary resin catalyst (e. g. 0.25% on bath weight zinc nitrate) was combined with an acrylic polymer emulsion (namely, polyethyl acrylate emulsion) to give a ratio of fifty parts acrylic polymer to fifty parts thermosetting resin and 114 parts sodium meta bisulfite. Woven cotton fabric was then padded through this mixture to give 10% pickup of solids followed by drying and curing.

*Example VIII*

The process of Example VII was repeated except that a butadiene/acrylonitrile/acrylic acid terpolymer rubber, such as Hycar 1571, was used in lieu of the acrylic polymer. Substantially equivalent results were obtained. Similar results were obtained using GR–S rubber (Pliolite 2105) for the polymer.

*Example IX*

The process of Example VII was repeated except that the ratio of acrylic polymer/thermosetting resin/sodium meta-bisulfite was changed to 90:10:23 with the same results.

It will be appreciated that various modifications may be made in the invention described herein without deviating from the spirit and intent thereof. Thus, for example, other fibrous materials such as paper, including paper pulp, or textile fibers and yarns may be effectively treated in the manner indicated in the preceding examples to control odors resulting from the application of thermosetting aldehyde resins thereto. These materials may be so treated either in a stage of their manufacture, for example, prior to extruding or subsequent thereto in the case of synthetic fibers such as viscose, rayon, or as an after treatment on the finished product. Thus, the scope of the invention is defined in the appended claims wherein, we claim:

1. In a process for treating filamentary or sheet material with an aldehyde resin involving the steps of applying said resin to the material followed by curing, the improvement whereby aldehyde odors are effectively prevented, said improvement comprising the steps of impregnating said material with a compound supplying the $HSO_3^-$ ion, at any stage in the treatment of said material from application of said resin until after curing thereof, and thereafter drying the material at elevated temperature in the presence of said ion, the amount of compound utilized being sufficient to react with all free and potentially free aldehyde in said material and varying between 0.01 mol and 1.0 mol per mol of aldehyde in the resin, when said compound is applied after curing, and being at least one mol per mol of aldehyde in the resin when said compound is applied prior to curing.

2. The process of claim 1, wherein said compound is a water soluble salt of sulfurous acid.

3. The process of claim 1, wherein said compound is sodium bisulphite.

4. The process of claim 1, wherein said material is a fibrous material.

5. The process of claim 1, wherein said material is woven fabric.

6. The process of claim 1, wherein said material is a non-woven fabric.

7. A process for preventing odors in filamentary or sheet material treated with an aldehyde resin and normally subject to said odors as a result of said treatment, comprising the steps of treating said material with said resin and curing the resin, then applying to the material a compound supplying the $HSO_3^-$ ion in amount between 0.01 and 1.0 mol per mol of aldehyde in the resin, and thereafter drying said material at elevated temperature in the presence of said ion.

8. The process of claim 7, wherein said compound is applied in aqueous solution having a pH between 5 and 6.

9. A process for preventing odors in filamentary or sheet material treated with an aldehyde resin and normally subject to said odors as a result of said treatment, comprising the steps of applying the resin and a compound supplying the $HSO_3^-$ ion to said material and thereafter drying at elevated temperature in the presence of said ion and curing said resin, said compound being present in amount sufficient to effectively prevent said odors, and being at least one mol per mol of aldehyde in the resin.

10. The process of claim 9 wherein said material is dried and cured after application of said resin and said compound by heating at a temperature between 250 and 325° F. for from 3 to ½ minute.

References Cited in the file of this patent

UNITED STATES PATENTS

| | | |
|---|---|---|
| 1,105,619 | Collardon | Aug. 4, 1914 |
| 1,727,135 | Schutte | Sept. 3, 1929 |
| 2,357,798 | Niederhauser | Sept. 12, 1944 |
| 2,407,599 | Auten et al. | Sept. 10, 1946 |

OTHER REFERENCES

Howard: "The Effect of Chlorine and Subsequent Treatment With Sodium Bisulfite Upon the Physical Properties of Cotton Fabrics Treated With Various Resins," Textile Research Journal, February 1956, vol. 26, p. 125.

Martin: "Chemistry of Phenolic Resins," p. 264, 1956.